G. R. Jackson.
Vault Cover.

Nº 17,096. Patented Apr. 21, 1857.

UNITED STATES PATENT OFFICE.

GEO. R. JACKSON, OF RYE, NEW YORK.

VAULT-COVER.

Specification forming part of Letters Patent No. 17,096, dated April 21, 1857; Reissued January 19, 1858, No. 520.

*To all whom it may concern:*

Be it known that I, GEORGE R. JACKSON, of Rye, in the county of Westchester and State of New York, have invented a new and useful Improvement in Illuminating Vault-Covers or other Covers Employed for Admitting Light from Above into Apartments; and I do hereby declare that the following is a full and exact description thereof, reference being had to the accompanying drawings, making a part of this specification.

Figure 1:
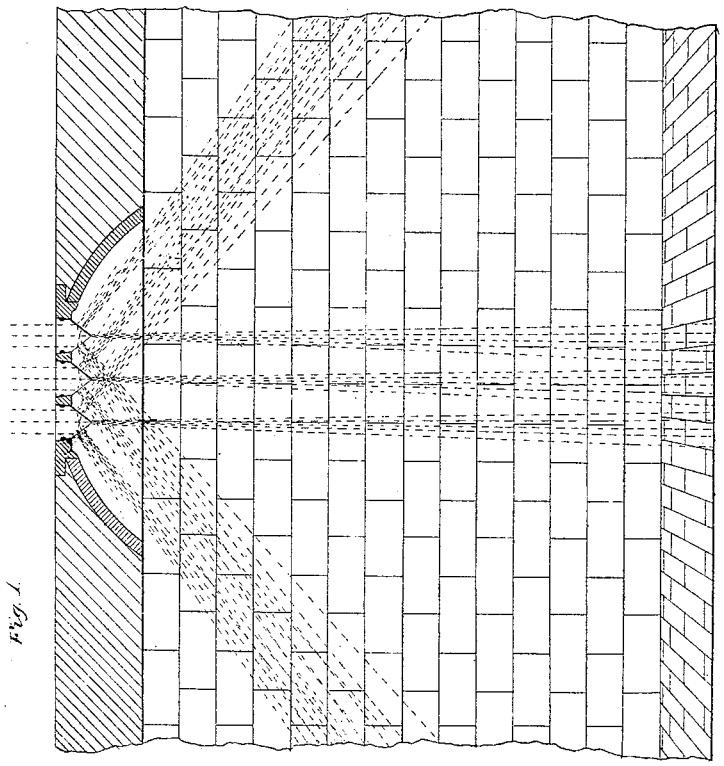

My improvement in illuminating vault-covers consists in the peculiar shape of the glasses employed by me for closing the apertures in the metallic portions of said covers,—viz, glasses of the form of an inverted pyramid, or other equivalent polygonal form which will, by reflection and refraction, laterally diffuse the descending rays of light uniformly throughout an apartment, and especially the upper portion thereof—substantially as represented in Figure 1, of the accompanying drawings.

Figure 2:
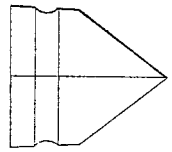
Figure 3:
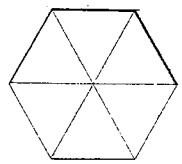

The size and the shape of the aforesaid illuminating glasses for vault-covers, which I am using at the present time, is shown by Figs. 2 and 3 of the accompanying drawings.

It is perhaps hardly necessary for me to say that the rays of light as they fall upon the inner faces of my improved vault-cover glasses, will be diverted from their vertical descent in the following manner, viz:—a portion of the light will pass directly through said faces in lines at right angles thereto, and a portion of the light will be reflected inward to the opposite faces of the glasses and pass through the same in lines at right angles to said faces, all substantially as represented in Fig. 1.

To enable the diverging rays of light passing through one of my improved vault-covers to pass freely into the apartment lighted thereby, the throat in the ceiling covered by said cover, should be of a flaring shape.

I am aware that Thaddeus Hyatt uses glasses in the form of a lens in his patented vault-covers; and that in his patent of March 27th, 1855, he represents and describes a glass lens of the form which he says he prefers for said vault-covers.

Figure 4:
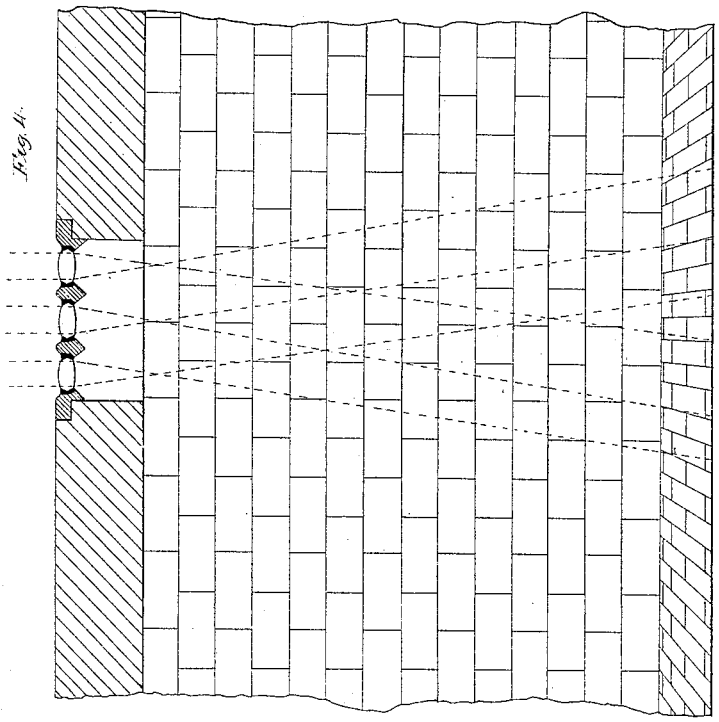
Figure 6:
Figure 5:
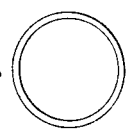

Figs. 5 and 6 of the accompanying drawings represent, by a top and edge view, the exact size and shape of Hyatt's glass lens above referred to; and Fig. 4 represents the direction taken by rays of light passing through a vault cover supplied with the aforesaid form of lens. An examination of this drawing will show that a ray of light in passing through Hyatt's glass lens is only refracted to such a degree as to turn it the distance of one foot from a vertical line in descending the distance of eight feet. It will therefore be perceived that the light must be very imperfectly distributed throughout apartments lighted through the medium of Hyatt's vault-cover, and should the glasses in Hyatt's vault-cover be of a spherical shape, the rays of light passing through said glasses would be refracted from vertical lines less than the distance of three feet during their descent to the bottom of the vault.

I am aware that a single-glass vault-cover was patented in 1834 by Edward Rockwell, and that the shape of the glass in said cover, as shown in Rockwell's patent, is nearly that of a plano-convex lens, the plane surface being uppermost. The glass employed by Rockwell in his illuminating vault-cover aforesaid, differs from that of an ordinary plano-convex lens simply in this, that its convex side, instead of having a smooth exterior, has a series of narrow annular shoulders rising one above the other from the apex of said surface, whose shape is such that most of the rays of light passing through said glass will descend vertically to the bottom of the vault.

What I claim as my invention and desire to secure by Letters Patent, is—

Combining glasses of an inverted pyramidal or polygonal form with the sash, or metallic portion, of an illuminating vault-cover, or its equivalent, for the purpose of producing a wider and more perfect diffusion of the light which may pass through said cover into the apartment beneath, substantially as herein set forth.

The above specification of my new and useful improvement in "illuminating vault covers," or other covers used for admitting light from above into apartments, signed and witnessed this 18th day of March, 1857.

G. R. JACKSON.

Witnesses:
THOMAS J. HALL,
JAMES J. BURNET.

[FIRST PRINTED 1912.]